(12) United States Patent
Filardo

(10) Patent No.: US 11,465,728 B2
(45) Date of Patent: Oct. 11, 2022

(54) AERIAL SWIMMER APPARATUSES, METHODS AND SYSTEMS

(71) Applicant: Pliant Energy Systems LLC, Brooklyn, NY (US)

(72) Inventor: Benjamin Pietro Filardo, New York, NY (US)

(73) Assignee: Pliant Energy System LLC, Brooklyn, NY (US)

( * ) Notice: Subject to any disclaimer, the term of this patent is extended or adjusted under 35 U.S.C. 154(b) by 271 days.

(21) Appl. No.: 16/888,255

(22) Filed: May 29, 2020

(65) Prior Publication Data

US 2020/0377187 A1 Dec. 3, 2020

Related U.S. Application Data

(60) Provisional application No. 62/854,893, filed on May 30, 2019.

(51) Int. Cl.
| | |
|---|---|
| *B64B 1/20* | (2006.01) |
| *B64B 1/24* | (2006.01) |
| *B64C 33/02* | (2006.01) |

(52) U.S. Cl.
CPC ............... *B64B 1/20* (2013.01); *B64B 1/24* (2013.01); *B64C 33/02* (2013.01)

(58) Field of Classification Search
CPC .. B64B 1/24; B64B 1/32; B64C 33/00; B64C 33/02; B64C 33/025; B63H 1/30;
(Continued)

(56) References Cited

U.S. PATENT DOCUMENTS

| 373,469 | A | * | 11/1887 | Morgan | .................. B64C 33/02 |
|---|---|---|---|---|---|
| | | | | | 244/72 |
| 411,779 | A | * | 10/1889 | Borgfeldt | ................ B64C 33/02 |
| | | | | | 244/22 |

(Continued)

FOREIGN PATENT DOCUMENTS

| CN | 106494618 A | * | 3/2017 | ............. B64C 33/02 |
|---|---|---|---|---|
| CN | 107792337 A | * | 3/2018 | ............... B63H 1/37 |

(Continued)

OTHER PUBLICATIONS

PCT International Search Report and Written Opinion, dated Aug. 24, 2020, for PCT/US20/35324, filed May 29, 2020.

*Primary Examiner* — Joseph W Sanderson
(74) *Attorney, Agent, or Firm* — Irell and Manella LLP

(57) ABSTRACT

A highly maneuverable craft, which may be lighter-than-air, is disclosed, having undulating fins of a light-weight material that may undulate along the horizontal axis of the craft and/or rotate 360 degrees and continuously about the central longitudinal axis of the craft. The fins may be actuated by motors coupled to the fins and coupled to the exterior of the craft via circumferential bands. Motion of the fins creates aerodynamic thrust. The circumferential bands may serve as tracks or channels along which the motors run, allowing the motors to travel 360 degrees or travel continuously around the exterior of the craft and thereby draw the fins about the craft. The circumferential bands may serve as reinforcing components, allowing the motors to exert torque against the body of the craft which may be thin-walled for maximum positive buoyancy. An on-board battery may power the motors via electrical circuits extending around the bands. The position and travel of the motors about the bands may be controlled by a central processing unit. A moveable (Continued)

weight, such as on a track with a motor, may be incorporated into or onto the craft for additional pitch control.

20 Claims, 9 Drawing Sheets

(58) Field of Classification Search
CPC .. B63H 1/32; B63H 1/37; F04D 33/00; F42B 10/62; F42B 10/64
See application file for complete search history.

(56) References Cited

U.S. PATENT DOCUMENTS

| | | | | |
|---|---|---|---|---|
| 1,730,758 A | * | 10/1929 | Jonathan | B64C 33/00 244/22 |
| 3,091,210 A | * | 5/1963 | Akutowicz | B63H 1/37 416/81 |
| 3,976,266 A | * | 8/1976 | Fieuzal | F42B 10/64 244/3.21 |
| 4,601,444 A | | 7/1986 | Lindenbaum | |
| 5,611,666 A | * | 3/1997 | Au | B63H 1/37 440/16 |
| 7,090,548 B1 | * | 8/2006 | Gusler | A61B 5/061 440/16 |
| 7,552,894 B2 | | 6/2009 | Barnes | |
| 8,610,304 B2 | | 12/2013 | Filardo | |
| 8,899,514 B2 | | 12/2014 | Goelet | |
| 9,073,532 B2 | | 7/2015 | Pedersen et al. | |
| 9,852,644 B2 | | 12/2017 | Salnikov et al. | |
| 10,190,570 B1 | * | 1/2019 | Filardo | B63H 1/37 |
| 10,519,926 B2 | * | 12/2019 | Filardo | F03B 13/10 |
| 11,148,773 B2 | * | 10/2021 | Garthwaite | B25J 11/00 |
| 2002/0106966 A1 | | 8/2002 | Jimenez et al. | |
| 2002/0139896 A1 | * | 10/2002 | Pellegri | F42B 10/64 244/3.24 |
| 2006/0172633 A1 | * | 8/2006 | Gusler | A61B 5/415 440/113 |
| 2010/0026003 A1 | | 2/2010 | Filardo | |
| 2015/0369227 A1 | | 12/2015 | Filardo | |
| 2017/0016424 A1 | | 1/2017 | Filardo et al. | |
| 2018/0022461 A1 | | 1/2018 | Nunes et al. | |
| 2019/0055917 A1 | | 2/2019 | Filardo | |
| 2020/0255108 A1 | * | 8/2020 | Garthwaite | B63G 8/08 |

FOREIGN PATENT DOCUMENTS

| | | | | |
|---|---|---|---|---|
| CN | 108974287 A | * | 12/2018 | B64C 33/00 |
| CN | 109131807 A | * | 1/2019 | B63G 8/38 |
| CN | 110127015 A | * | 8/2019 | |
| CN | 111268086 A | * | 6/2020 | |
| CN | 112693604 A | * | 4/2021 | B64C 33/00 |
| EP | 0814315 A1 | * | 12/1997 | B64B 1/40 |
| EP | 2029425 B1 | * | 11/2014 | B63H 1/37 |
| WO | WO-2019042238 A1 | * | 3/2019 | B64B 1/40 |

* cited by examiner

FIG. 5
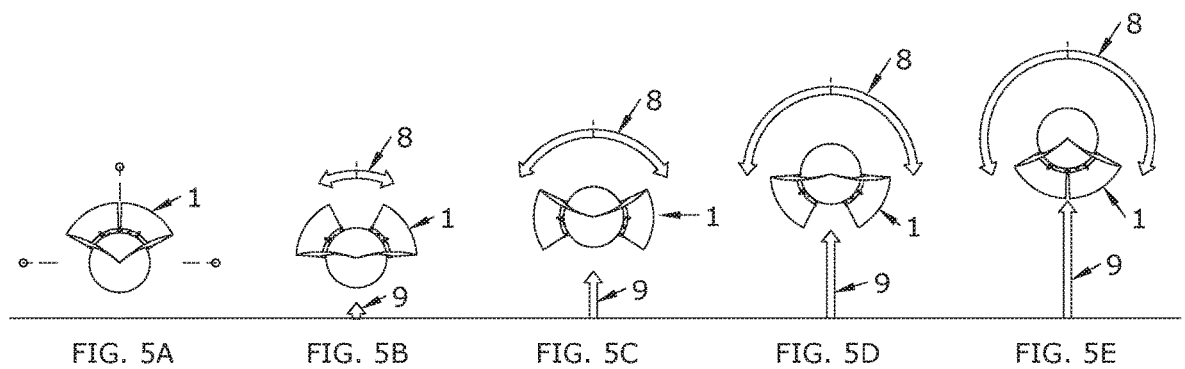
FIG. 5A  FIG. 5B  FIG. 5C  FIG. 5D  FIG. 5E
FIG. 6
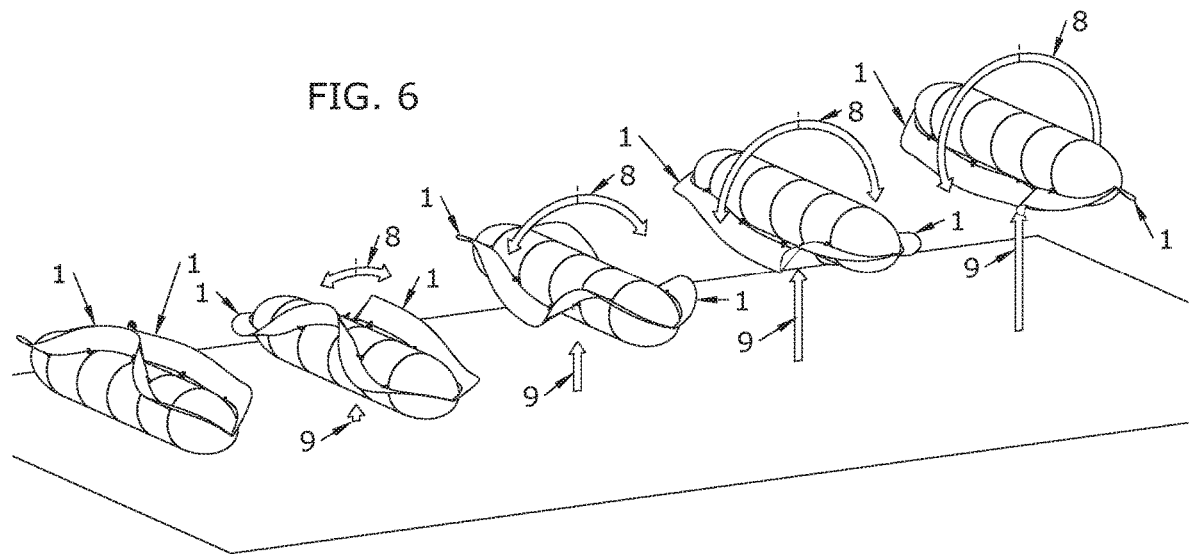

AERIAL SWIMMER APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM AND RELATED APPLICATIONS

This application is a non-provisional of and claims priority under 35 U.S.C. § 119(e) to prior U.S. provisional patent application Ser. No. 62/854,893, entitled, "Aerial Swimmer Apparatuses, Methods and Systems," filed May 30, 2019. The entire contents of the aforementioned application are hereby incorporated in their entirety herein by reference.

This application is also related to co-pending international patent application serial no. PCT/US20/35324, entitled, "Aerial Swimmer Apparatuses, Methods and Systems," filed May 29, 2020.

FIELD

The present innovations generally address vehicle control, and more particularly, include AERIAL SWIMMER APPARATUSES, METHODS AND SYSTEMS.

SUMMARY

A highly maneuverable craft, which may be lighter-than-air, is disclosed, having undulating fins of a light-weight material that may undulate along the horizontal axis of the craft and/or rotate 360 degrees and continuously about the central longitudinal axis of the craft. The fins may be actuated by motors coupled to the fins and coupled to the exterior of the craft via circumferential bands. Motion of the fins creates aerodynamic thrust. The circumferential bands may serve as tracks or channels along which the motors run, allowing the motors to travel 360 degrees or travel continuously around the exterior of the craft and thereby draw the fins about the craft. The circumferential bands may serve as reinforcing components, allowing the motors to exert torque against the body of the craft which may be thin-walled for maximum positive buoyancy. An on-board battery may power the motors via electrical circuits extending around the bands. The position and travel of the motors about the bands may be controlled by a central processing unit. A moveable weight, such as on a track with a motor, may be incorporated into or onto the craft for additional pitch control.

In one implementation, an apparatus is disclosed, comprising: a craft body; a plurality of circumferential bands attached to and encircling an outer surface of the craft body, the plurality of circumferential bands being spaced apart from each other along a longitudinal direction on the outer surface of the craft body; a first fin attached along one first fin side to a first plurality of motor assemblies, each of the first plurality of motor assemblies coupled to one of the plurality of circumferential bands and configured to travel along the one of the plurality of circumferential bands upon actuation; and a second fin attached at along one second fin side to a second plurality of motor assemblies, each of the second plurality of motor assemblies coupled to one of the plurality of circumferential bands and configured to travel along the one of the plurality of circumferential bands upon actuation.

BRIEF DESCRIPTION OF THE DRAWINGS

The accompanying appendices and/or drawings illustrate various non-limiting, example, innovative aspects in accordance with the present descriptions:

FIGS. 5A-5E show a head-on view of a craft in a sequence of positions whereby its fins rotate in unison from a fully upward position to a fully downward position in one embodiment of an aerial swimmer;

FIG. 6 shows a perspective view of the sequence shown in FIG. 5;

DETAILED DESCRIPTION

Figure 1:
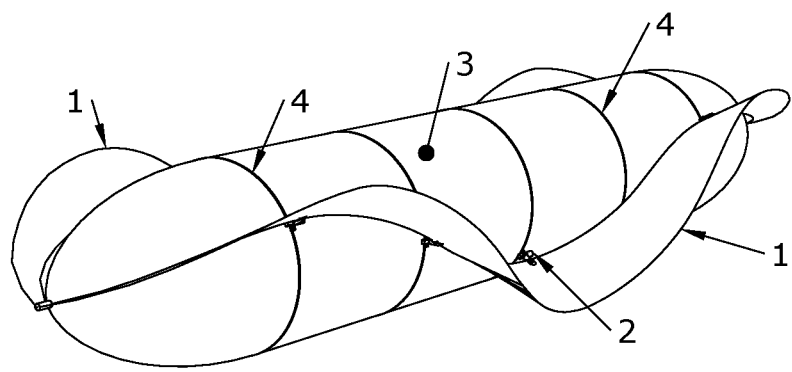
FIG. 1 shows a perspective view of a craft with two fins in mirrored phase position in one embodiment of an aerial swimmer.

A highly maneuverable craft is disclosed, which may be lighter-than-air (such as an airship, aerostat, blimp, dirigible and the like), having undulating fins 1 made of a light-weight material and having a hyperbolic geometry. Although described as lighter-than-air and/or referred to herein as an "aerial swimmer," it is to be understood that embodiments of the disclosed craft may be configured for use in other gases or fluid media, such as water. The fin 1 may undulate along the longitudinal axis of the craft and/or rotate 360 degrees about a central longitudinal axis of the craft, FIGS. 1-4. The fins 1 may be actuated, e.g., by small motors 2 coupled to the fins 1 and coupled to the exterior body 3 of the craft, such as via circumferential bands 4. The circumferential bands 4 may serve as tracks along which the motors 2 may run, allowing the motors 2 to travel, e.g., 360 degrees, and/or continuously around the exterior of the craft and thereby drawing the fins about the central longitudinal axis of the craft. The circumferential bands 4 may serve as reinforcing components for the craft, allowing the motors to exert torque against the body 3 of the craft, which may be thin-walled to facilitate positive buoyancy. In one implementation, one or more batteries 5 and/or other power source powers the motors 2. The position and travel of the motors 2 about the circumferential bands 4 may be controlled, in one implementation, by a central processing unit ("CPU") 6. In some implementations, the CPU may be coupled to a memory storing instructions issuable to the motor assemblies causing them to perform various motions of the craft, including synchronized and/or coordinated action to effect 3D holonomic maneuverability of the craft. In one implementation, a moveable weight 7 may be incorporated into or onto the craft for additional pitch control, such as by a motor that moves the weight along a track along the longitudinal axis of the craft.

Figure 2:
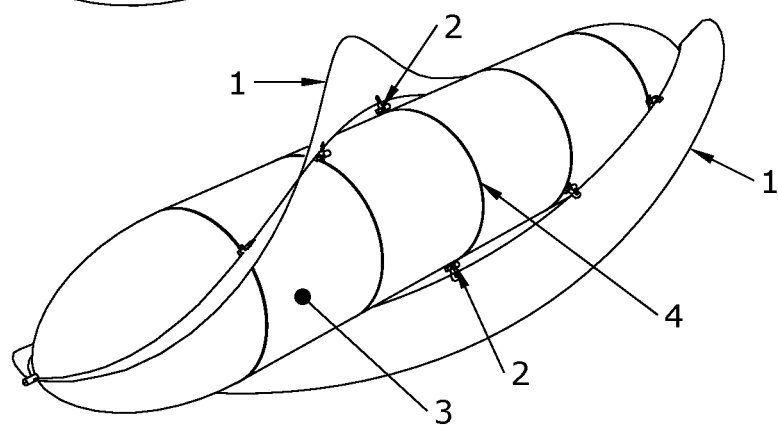
FIG. 2 shows a perspective view of a craft with two fins in a spiral configuration in one embodiment of an aerial swimmer.
Figure 3:
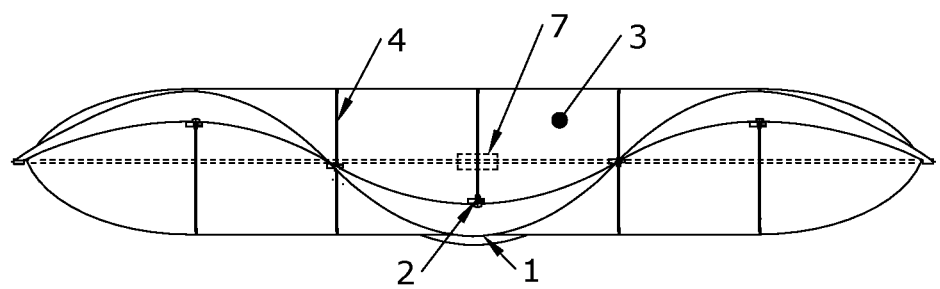
FIG. 3 shows a side view of a craft with two fins in mirrored phase position in one embodiment of an aerial swimmer.
Figure 4:
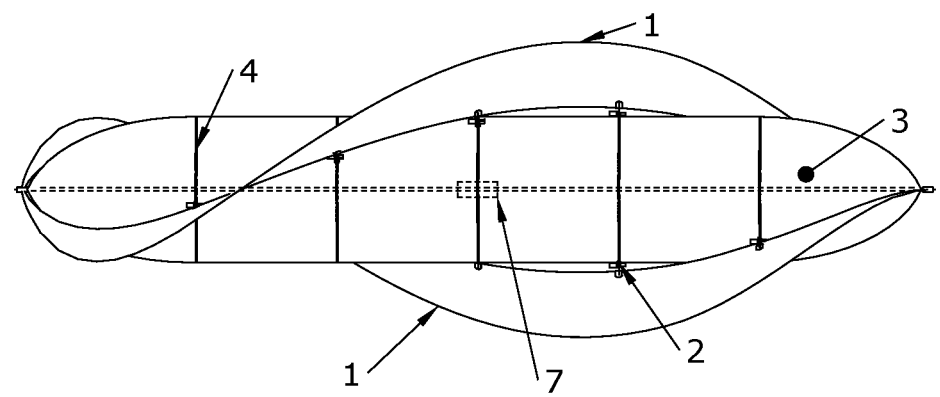
FIG. 4 shows a side view of a craft with two fins in a spiral configuration in one embodiment of an aerial swimmer.

The fins 1 may be arranged in operation and/or on the fly into multiple configurations allowing, e.g., for rapid pitch, yaw and/or roll for 3D holonomic maneuverability, or near 3D holonomic maneuverability. For example, the craft may be configured to rotate about its central horizontal axis, to move straight up or straight down, and may move forwards or backwards with equal speed and agility. FIG. 1 and FIG. 3 illustrate a craft with two fins 2 in a mirrored phase position. FIG. 2 and FIG. 4 illustrate the craft of FIG. 1 and FIG. 2 but where its fins have been moved into a spiral configuration by the motors 2.

Actuated by the motors 2, the fins 1 may exhibit traveling waves to create propulsive thrust in a manner similar to a cuttlefish or knife fish. The fins 1 may also or alternatively create thrust through a "flapping" action in which the whole fin 1 sweeps upwards or downwards in a similar manner to that of a bird in flight. The fins 1 may exhibit both traveling wave action and flapping action simultaneously, and the angle of the fins may be tilted relative to the longitudinal axis of the craft.

The craft may move straight up or straight down regardless of whether it is making forwards or backwards progress. FIGS. 5A-5E illustrates a head-on view of the craft in a sequence of positions whereby its fins 1 rotate 8 in unison from a fully upward position (FIG. 5A), through intermediate positions (FIGS. 5B-5D), to a fully downward position (FIG. 5E) to create vertical lift 9 by creating negative fluid pressure above craft and positive pressure below the craft. This action can be performed in reverse to move the craft straight downwards. Continuous upward or continuous downward motion can be created, for example, by varying the speed between upwards or downwards fin 1 sweeps. For continuous upwards travel, for example, the fins 1 sweep more slowly on the upwards stroke and more quickly on the downwards stroke during repeated cycles. FIG. 6 is a perspective view of the sequence shown in FIGS. 5A-5E.

Figure 7:
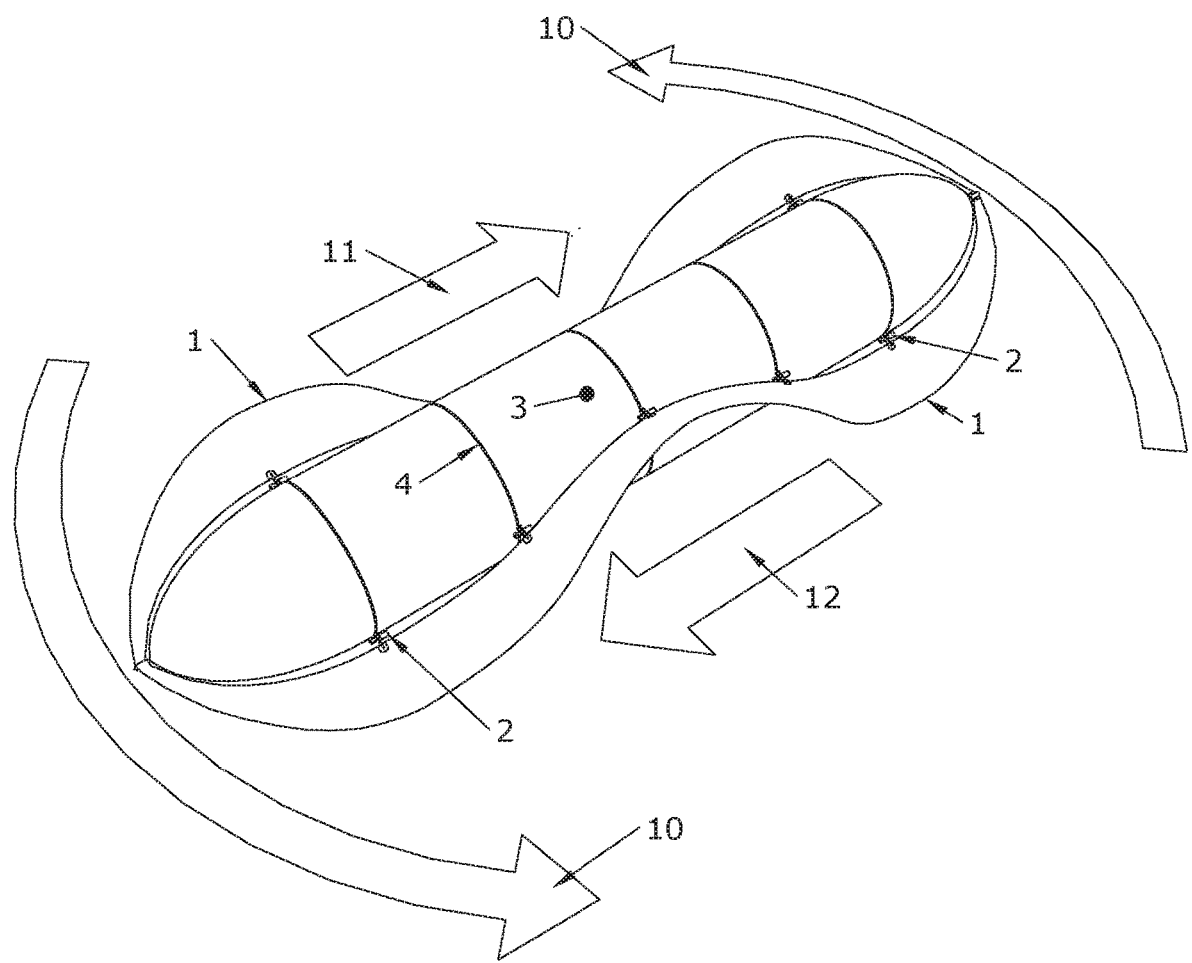
FIG. 7 shows a perspective view of a craft rotating about the center of its vertical axis in one embodiment of an aerial swimmer.

FIG. 7 illustrates the craft's ability to rotate 10 about the center of its vertical axis, during which the traveling wave direction 11 of a first fin 1 is opposite to the traveling wave direction 12 of a second fin 1.

Figure 8:
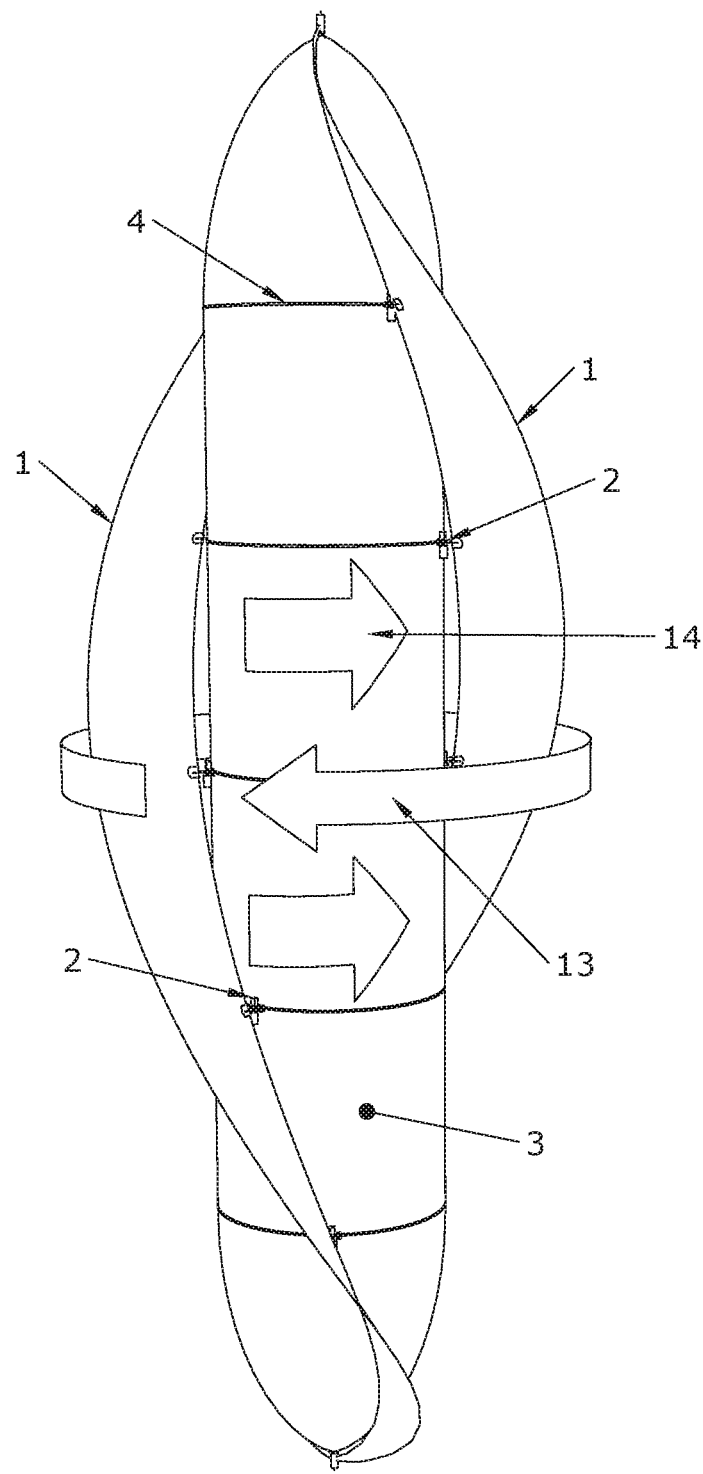
FIG. 8 shows a side view of a craft rotating continuously about its longitudinal axis in one embodiment of an aerial swimmer.

FIG. 8 illustrates how the vehicle may rotate continuously about its longitudinal axis by configuring its fins 1 into spirals, for example, and rotating the fins 1 continuously about the craft's longitudinal axis, whereby the fins 1 rotate in one direction 13 by reacting against the body of the vessel 3, causing the body of the vessel 3 to rotate 14 in the opposite direction. Such spinning may be used, for example, in mobile radar applications where the vehicle may, for example, be oriented in a vertical position.

Figure 9:
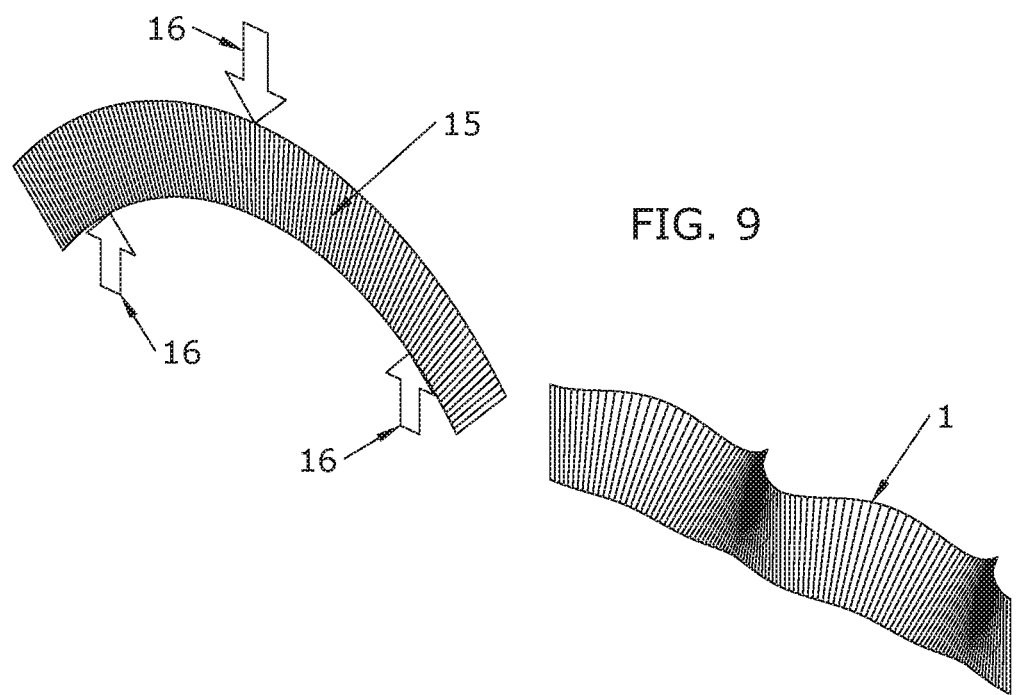
FIG. 9 illustrates creation of a fin with a hyperbolic geometry in one embodiment of an aerial swimmer.

FIG. 9 illustrates one method for creating a fin 1 with a hyperbolic geometry by taking an arch-shaped flat sheet of flexible material 15 and applying deforming loads 16 whereby the sheet of flexible material 15 takes on strained sinusoidal deformations that are an expression of its internal energy state. Another method for creating a fin 1 is through tiling whereby tiles of flexible material are assembled to form a fin 1. With the tiling method, deformation of each tile is required to line up with the edges of adjacent tiles to create a scalloped or crenated form, having a hyperbolic geometry that exhibits progressively steeper deformation amplitudes towards the outer edge of the fin 1.

Figure 10:
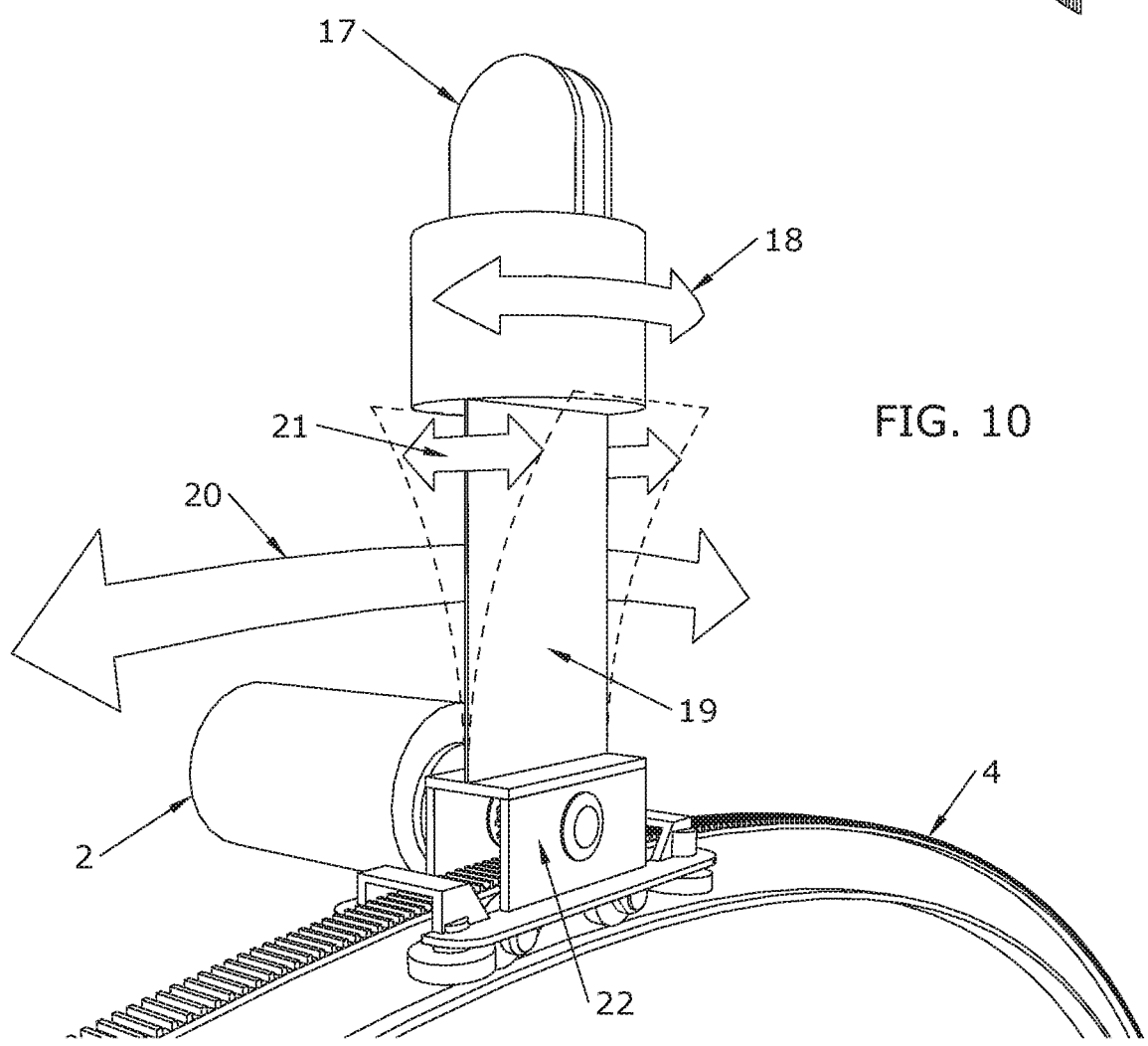
FIG. 10 illustrates attachment of a fin a craft body and movement of the fin relative to the craft body in one embodiment of an aerial swimmer.

FIG. 10 illustrates, in one implementation, the method for attaching the fin 1 to the body 3 of the craft and moving the fin 1 relative to the body 3 of the craft. A fin coupling member 17 is coupled to a flexible vertebra 19, and the fin coupling member 17 is able to partially rotate 18 relative to the longitudinal axis of the vertebra 19, e.g., via a bearing or without a bearing by rotationally twisting the flexible vertebra 19, in various implementations. The flexible vertebra 19 is able to withstand substantial radial torque in the direction 20 relative to the of the craft body 3, and is substantially flexible in the direction 21 parallel to the longitudinal axis of the craft body 3. The flexible vertebra 19 is coupled to a chassis 22 which is coupled to a motor 2. The motor 2 engages the circumferential band 4 and gains purchase on the circumferential band 4 such that rotation of the motor shaft 23 causes the chassis 22 to travel 20 about the craft body via the circumferential band 4.

Figure 11:
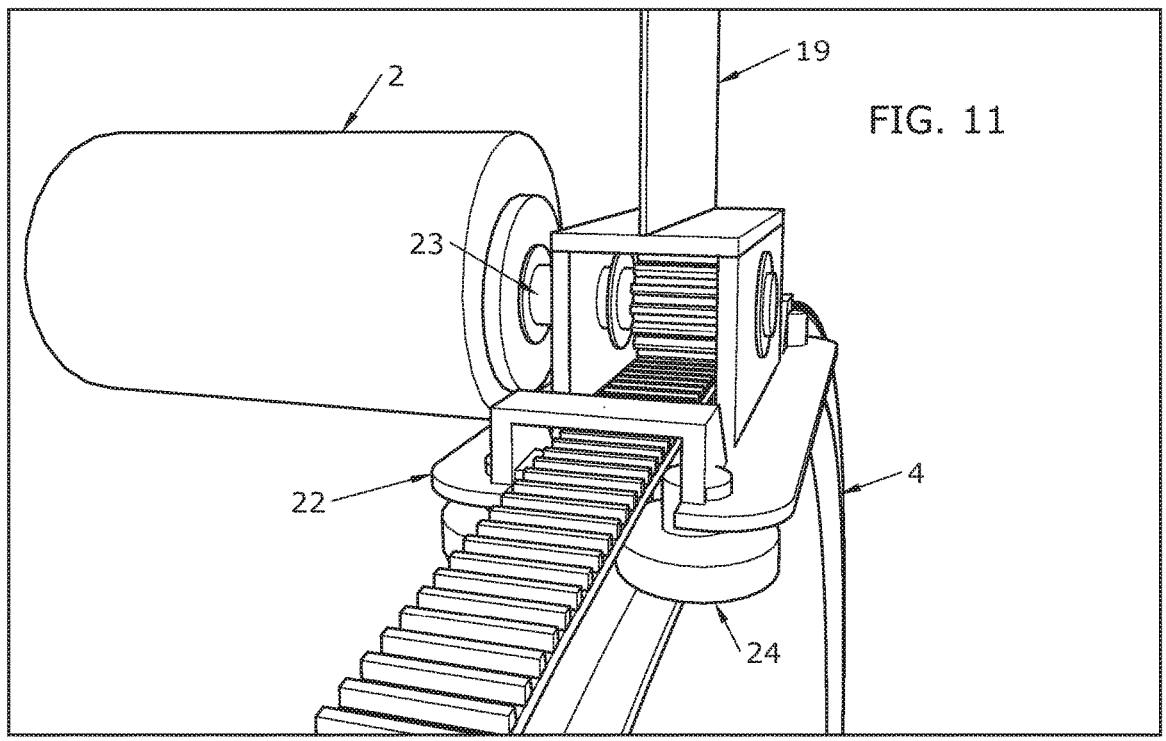
FIGS. 11-12 show two views of wheels or rollers coupled to the chassis maintaining alignment between the motor shaft and the circumferential band in one embodiment of an aerial swimmer.
Figure 12:
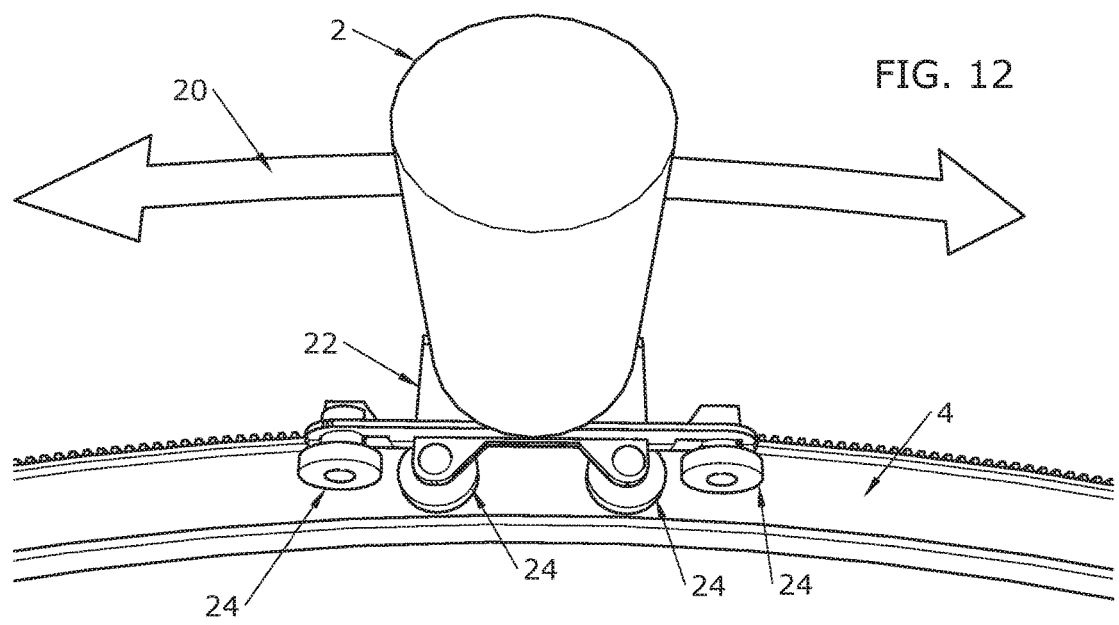

In one implementation, guides, wheels, rollers, and/or the like 24 coupled to the chassis 22 may maintain alignment and/or contact between the motor shaft 23 and the circumferential band 4, FIGS. 11-12.

Figure 13A:
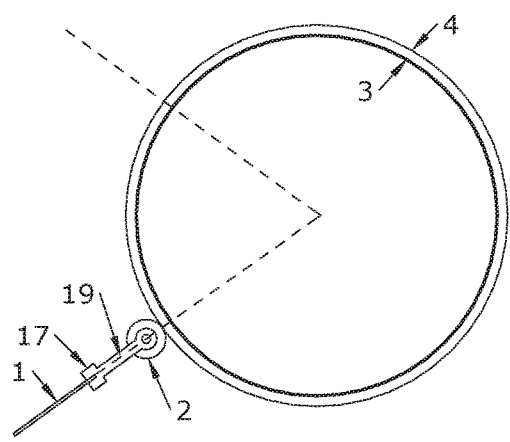
FIGS. 13A-13B show diagrammatic cross sections of a craft, with fin at first position, 13A, and a second position, 13B, as a motor travels around the craft body in one embodiment of an aerial swimmer.
Figure 13B:
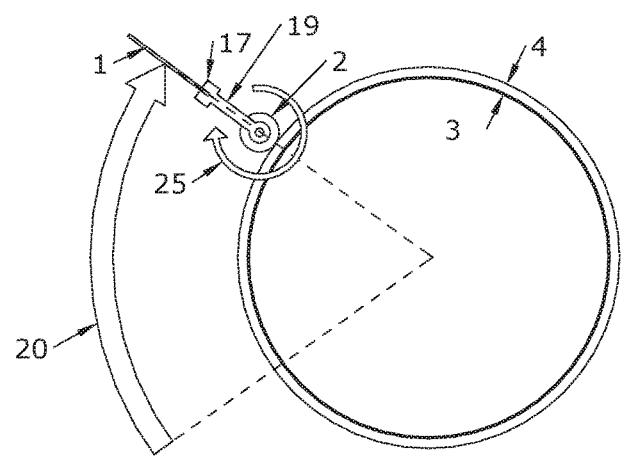

In one implementation, FIGS. 11-12, rotation 25 of the motor 2 shaft 23 causes the motor 2 to travel circumferentially around the body 3 of the vessel on circumferential bands 4 that may be tracks, channels, and/or the like. The motor 2 travelling around the body 3 causes the position of the fin at its point of attachment to the fin coupling member 17, to rotate 20 about the longitudinal axis of the craft. FIGS. 13A-13B show a diagrammatic cross section of the craft illustrating the fin at a first position, FIG. 13A, and a second position, FIG. 13B.

Figure 14A:
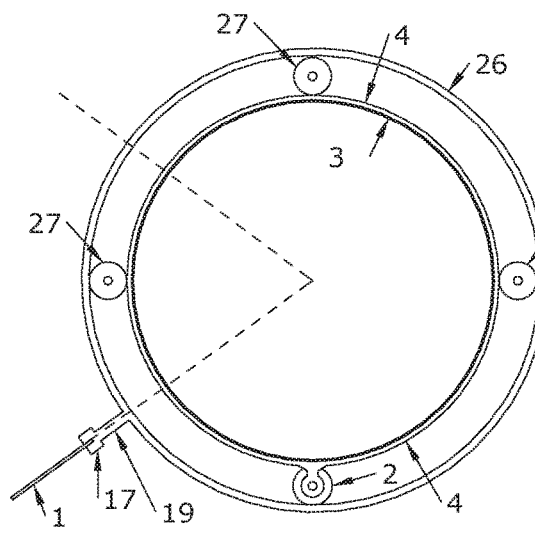
FIGS. 14A-14B show diagrammatic cross sections of a craft, with fin at first and second position, as a motor travels around the craft body on a secondary band coupled to a circumferential band by interstitial rollers in one embodiment of an aerial swimmer.
Figure 14B:
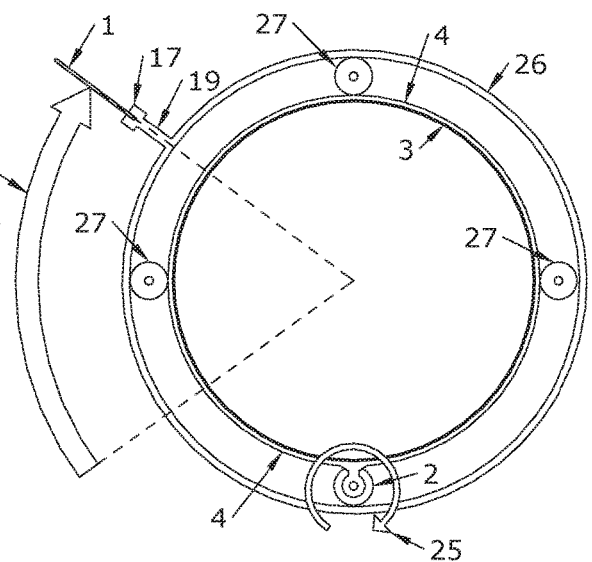

In another implementation, the motor 2 may be rigidly fixed to the circumferential band 4 and coupled via the motor shaft 23 to a secondary band 26, so that rotation of the motor shaft 23 reacts against the secondary band 26 to rotate 20 the secondary band 26, e.g., about the longitudinal axis of the craft, FIG. 14. The fin coupling member 17 and flexible vertebra 19 are fixed to the secondary band 26 and fixed to the fin 1, so that rotation 20 of the secondary band 26 via the motor 2, causes the fin 1 to rotate 20 at its point of attachment to the fin coupling member 17. In one implementation, one or more interstitial rollers 27 may be inserted between the circumferential band 4 and the secondary band 26. FIGS. 14A-14B show a diagrammatic cross section of the craft illustrating the fin at a first position, FIG. 14A, and a second position, FIG. 14B. In the implementation shown in FIG. 14, the motor rotates a secondary band 26 to which the fin 1 is attached while the motor 3 remains statically fixed to the body 3.

For the implementation illustrated in FIGS. 13A-13B, electric power to the motors 2 may be distributed to electric circuits in the circumferential bands 4. Electrical contact may be made, e.g., via conductive roller bearings connected to the motors 2 and to the circuits of the circumferential bands 4. In another implementation, conductive brushes may electrically connect the motors 2 to the circuitry in the circumferential bands 4.

A central processing unit (CPU) 6 may be used to control the rotations of the motors, and in some implementations, position sensors 28 (e.g., optical tracking, capacitive, inductive, magnetic, gyroscopic, potentiometric, and/or the like sensors) may be utilized to compare intended position of the motors 2 or fins 1 with actual positions of the motors 2 or fins 1. In various implementations, the CPU may implement feedback and control processes stored in a memory (e.g., via a proportional-integral-derivative controller) to adjust control of the craft based on information from the position sensors.

Figure 15:
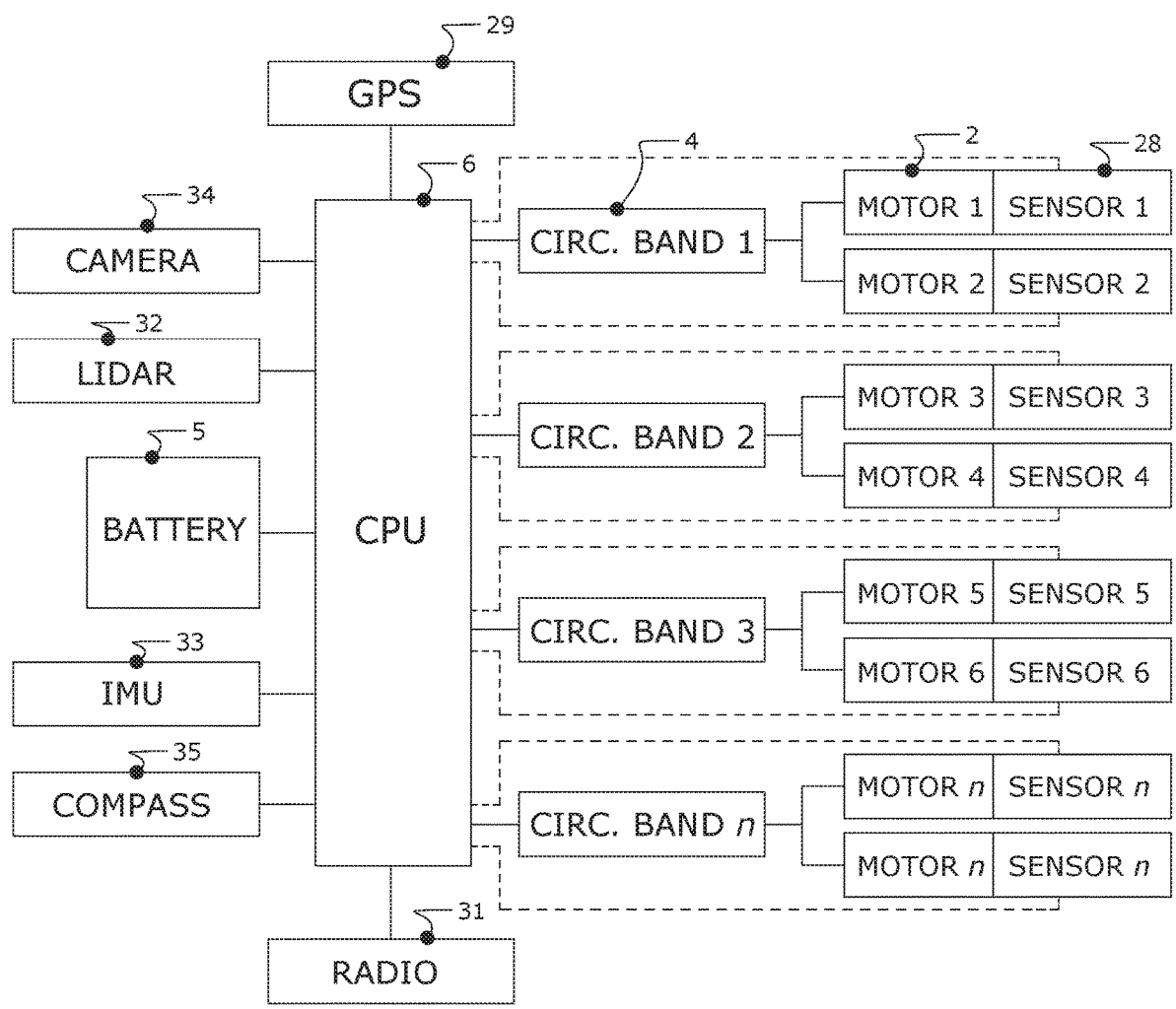
FIG. 15 shows a diagrammatic illustration of components of a craft's electromechanical system in one embodiment of an aerial swimmer.

FIG. 15 is a diagrammatic illustration of one implementation (e.g., FIGS. 13A-13B) showing one configuration with a battery 5, CPU 6, circumferential bands 4, motors 2, position sensors 28, GPS unit 29, compass 30, radio antennae 31, LIDAR 32, inertial measuring unit (IMU) 33, camera 34, and compass 35.

Figure 16:
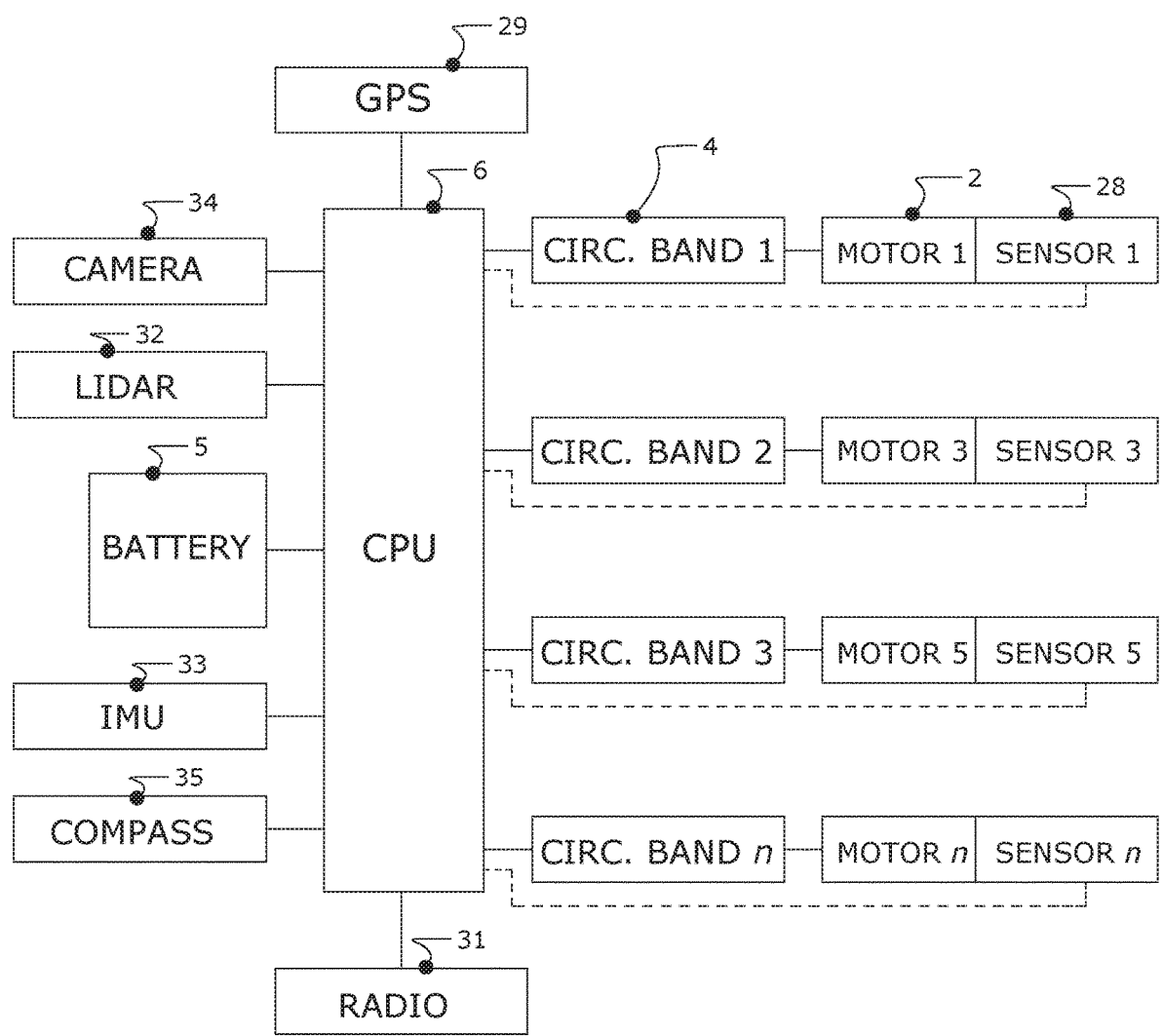
FIG. 16 shows a diagrammatic illustration of components of a craft's electromechanical system in another embodiment of an aerial swimmer.

FIG. 16 is a diagrammatic illustration of one implementation (e.g., FIGS. 14A-14B) showing one configuration with a battery 5, CPU 6, circumferential bands 4, motors 2, position sensors 28, GPS unit 29, compass 30, radio antennae 31, LIDAR 32, inertial measuring unit (IMU) 33 camera 34 and compass 35.

In other embodiments, the craft as described may be heavier than air and/or may operate in water or other fluid media.

In order to address various issues and advance the art, the entirety of this application for AERIAL SWIMMER APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any process steps and/or feature sets as described in the figures and/or throughout are not limited to a fixed operating order and/or arrangement, but rather, any disclosed order is exemplary and all equivalents, regardless of order, are contemplated by the disclosure. Similarly, some features are applicable to one aspect of the innovations, and inapplicable to others. In addition, the disclosure includes multiple innovations including some that may not be presently claimed, and the Applicant reserves all rights in those presently unclaimed innovations including the right to claim such innovations, file additional applications, continuations, continuations in part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims.

What is claimed is:

1. An apparatus, comprising:
   a craft body;
   a plurality of circumferential bands attached to and encircling an outer surface of the craft body, the plurality of circumferential bands being spaced apart from each other along a longitudinal direction on the outer surface of the craft body;
   a first fin attached along one first fin side to a first plurality of motor assemblies, each one of the first plurality of motor assemblies coupled to a respective one of the plurality of circumferential bands and configured to travel along the one of the plurality of circumferential bands upon actuation; and
   a second fin attached at along one second fin side to a second plurality of motor assemblies, each one of the second plurality of motor assemblies coupled to a respective one of the plurality of circumferential bands and configured to travel along the one of the plurality of circumferential bands upon actuation.

2. The apparatus of claim 1, wherein the first and second fins are attached to each motor assembly of the first and second pluralities of motor assemblies, respectively, via a flexible vertebra.

3. The apparatus of claim 2, wherein the flexible vertebra is coupled to the first and second pluralities of motor assemblies, respectively, by at least one bearing.

4. The apparatus of claim 1, wherein each of the first and second fins has a hyperbolic surface geometry.

5. The apparatus of claim 4, wherein each of the first and second fins comprise an assemblage of flexible tiles.

6. The apparatus of claim 1, wherein the craft body comprises a lighter-than-air craft.

7. The apparatus of claim 1, wherein the first and second pluralities of motor assemblies each comprise at least one chassis having guiding elements configured to maintain alignment between a motor shaft and the one of the plurality of circumferential bands.

8. The apparatus of claim 1, wherein the circumferential bands further comprise electric circuits for delivering energy to the first and second pluralities of motor assemblies.

9. The apparatus of claim 1, wherein the electric circuits comprise conductive roller bearings connected to each of the first and second pluralities of motor assemblies.

10. The apparatus of claim 1, further comprising:
at least one central processing unit configured to actuate motors of the first plurality of motor assemblies and the second plurality of motor assemblies.

11. The apparatus of claim 10, further comprising:
a plurality of position sensors, wherein each of the plurality of position sensors is coupled to at least one of the first and second pluralities of motor assemblies and configured to measure a position thereof and communicate the position to the central processing unit.

12. The apparatus of claim 10, further comprising:
a memory coupled to the at least one central processing unit configured to store instructions issuable by the central processing unit to the plurality of motor assemblies.

13. The apparatus of claim 12, wherein the instructions include at least one of traveling wave coordination and flapping coordination.

14. The apparatus of claim 12, wherein the instructions include transverse axis rotation.

15. The apparatus of claim 12, wherein the instructions include proportional-integral-derivative controller instructions.

16. The apparatus of claim 1, further comprising:
at least one pitch control attached to at least one of the plurality of circumferential bands.

17. The apparatus of claim 16, wherein the pitch control comprises a weight configured to move along a track along the longitudinal axis of the craft body by action of a pitch control motor.

18. A vehicle with at least one flexible fin multiply coupled to an exterior body of the vehicle by motors that move along tracks or guides running radially around the exterior of the vehicle.

19. The vehicle of claim 18 wherein the at least one flexible fin comprises an assemblage of flexible tiles.

20. The vehicle of claim 18 further comprising,
at least one central processing unit configured to actuate the motors;
a plurality of position sensors coupled to the motors and configured to measure a position thereof and communicate the position to the central processing unit; and
a memory coupled to the at least one central processing unit configured to store instructions issuable by the central processing unit to the plurality of motors.

* * * * *